Figure 1:
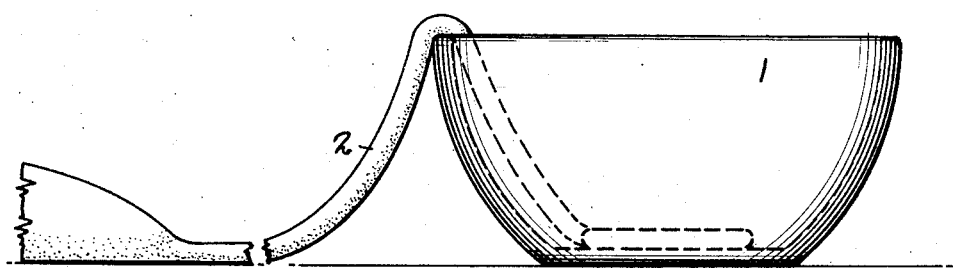

April 24, 1928.

A. VARKAS ET AL 1,667,335

PROCESS OF MAKING CANDY BASKETS

Filed July 1, 1926  2 Sheets-Sheet 1

James B. Varkas
Nick Varkas
Aris Varkas
James Paxon
Inventors

Witnesses
C. E. Churchman Jr.
Robt H. Read

By Richard B. Owen
Attorney

April 24, 1928. 1,667,335

A. VARKAS ET AL

PROCESS OF MAKING CANDY BASKETS

Filed July 1, 1926 2 Sheets-Sheet 2

James B. Varkas
Nick Varkas
Aris Varkas
James Paxon
Inventors

Witnesses
C. E. Churchman Jr.
Ross H. Read

By Richard B. Owen
Attorney

Patented Apr. 24, 1928.

1,667,335

UNITED STATES PATENT OFFICE.

ARIS VARKAS, NICK VARKAS, JAMES B. VARKAS, AND JAMES PAXON, OF BOISE, IDAHO.

PROCESS OF MAKING CANDY BASKETS.

Application filed July 1, 1926. Serial No. 119,965.

This invention relates to a process of manufacturing candy baskets and similar candy products of ornamental design. The first step in the process is to prepare the candy mixture. A batch may consist of thirteen pounds of cane sugar, two pounds of glucose, and one teaspoonful of cream of tartar. This is heated to 345 degrees F., the heat varying according to the altitude, that just given being suitable to Boise, Idaho. When sufficiently cooked to expel the proper amount of water for crystallization of the sugar, it is removed from the fire. The time of removal from the fire is determined by the judgment of a skilled candy maker. When cooked sufficiently to produce a stick candy mixture, the batch is transferred to marble slabs and there cut into as many portions as the number of colors desired in the baskets and each portion is given a distinct color by the use of suitable pigments.

The next step in the process consists in gathering together the portions of the batch and kneading them, and then placing the kneaded batch on a pulling table, subjecting the same to heat, and rolling the same into the form of a strand of the desired diameter.

Molds, selected according to size of baskets desired are placed on the pulling table and the inside of the molds are very lightly greased with cocoa butter which enables the baskets to be discharged from the molds readily when cold. At this point the actual work of making the baskets begins and it must proceed with great speed, dexterity and skill, or the colors will run and ruin not only the baskets but the batch of candy as well, or the candy will lose its plasticity and the work of coiling or weaving the candy into baskets will be interfered with and the materials wasted.

Four workmen are employed in the simplest process. The first man draws out candy from the batch to the desired size of strand. The second man coils or weaves the strand of candy into the mold beginning in the center at the bottom of the mold and working it rapidly upwards around the inside of the mold until the basket proper is built up. The third man places the molds for the handles on the basket and returns it to the second man who puts on the handles which comprise suitable lengths of the strands prepared by the first man. The fourth man maintains the handles in place upon the handle molds and removes the baskets from the molds, by first removing the handle mold by gently pressing inwardly against the legs of the horse shoe shaped mold to contract the same; then the complete basket is removed by picking the basket mold up in one hand and tipping the basket out of the said mold into the other hand. The entire batch is worked into completed baskets in about one hour. After the baskets are thus completed they are ornamented in any desired design. So far as known no competitor has been able to make such perfect and beautiful baskets, nor to make any successfully and without profit killing waste.

The invention comprises also other features, the novelty of which will be hereinafter more fully described in the specification and specifically indicated in the claims.

Figure 2:
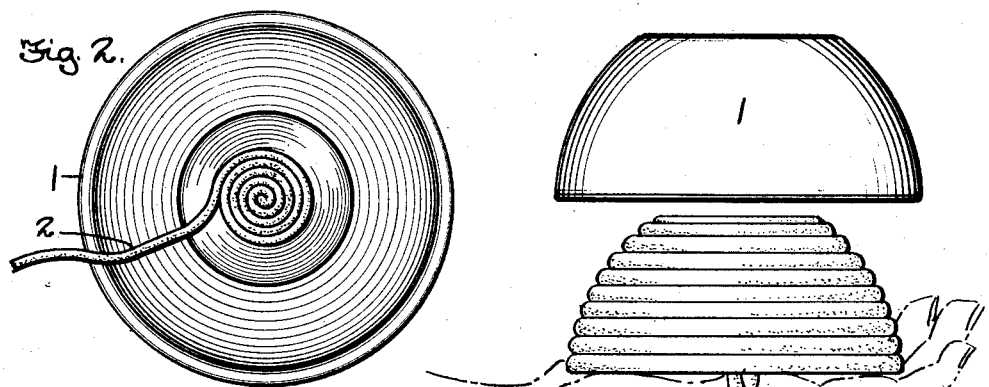
Figure 3:
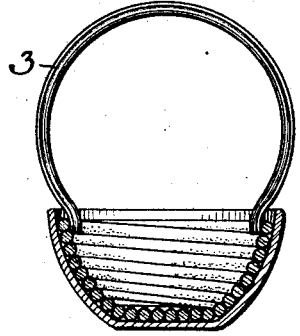
Figure 4:
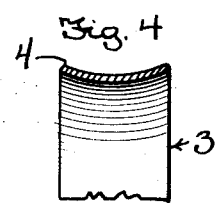
Figure 5:
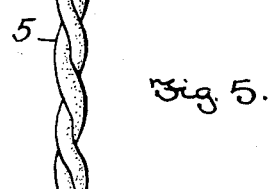
Figure 6:
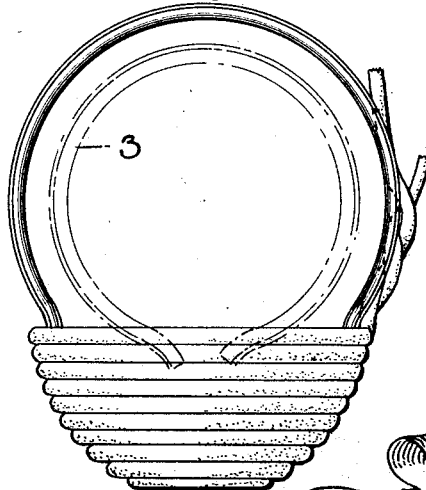
Figure 7:
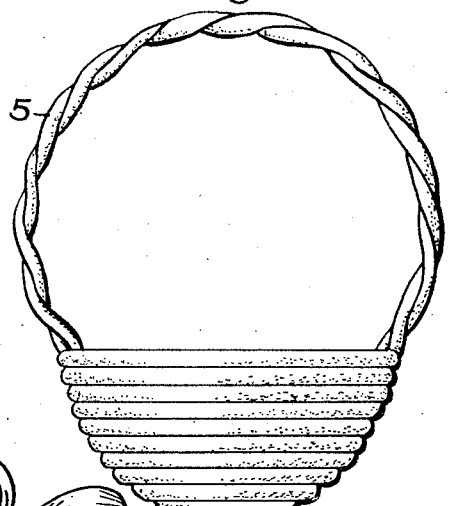
Figure 8:
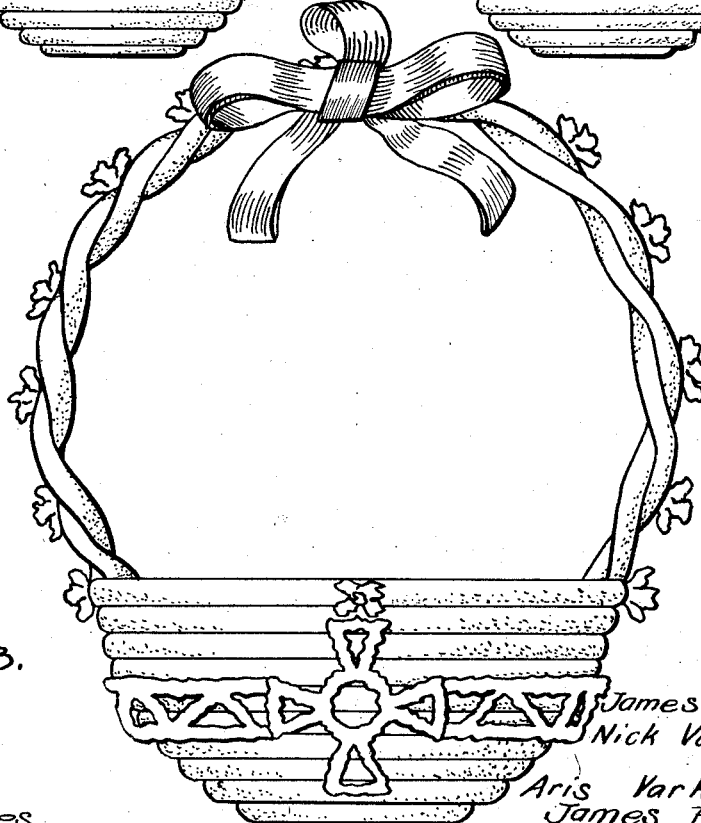

In the drawings:

Figure 1 shows the mode of coiling a candy strand into a basket form in a mold, the mold and candy batch being shown in side elevation, Figure 2 is a plan view illustrating the step shown in Figure 1, Figure 3 shows the step of forming the handle, Figure 4 is a sectional fragmentary view of the mold for the handle, Figure 5 shows the method of removing a completed basket from the mold, Figure 6 shows the step followed in affixing the handle, Figure 7 shows the completed basket with handle, Figure 8 shows the finished basket after ornamenting.

In Figure 1 the numeral 1 indicates a bowl of concavo-convex conformation and having its walls suitably shaped to form the coil of the basket body. The bowl is first lightly greased with cocoa butter to prevent the candy adhering to the walls. The strand of colored candy 2 at the time it is coiled into the mold still retains sufficient heat to be plastic and is started as a coil in the center of the bottom of the bowl and coiled outwardly and upwardly against the concave walls to the desired height of the basket. The handle is next formed by the use of the form 3 which is of horseshoe outline and is provided with a concave channel, as shown at 4 in Figure 4. A pair of the strands 2 are twisted or braided to form the handle 5 and are laid around the form 3, in the channel 4 thereof as will be evident from Figure 5 and separated at their ends and united to the basket body, the operation being completed while the basket still remains in the bowl as shown in Figure 3. When the completed basket has chilled and the whole structure is firm the handle form is contracted and removed and the basket is ready for the final ornamentation as shown in Figure 8, the ornaments being affixed while they are in a plastic state.

Having thus described our invention, what we claim as new and desire to secure by Letters Patent is:

1. The process of making candy baskets which comprises coiling a candy strand, while heated to a degree to render it plastic, initially in the bottom of a concave mold, and disposing the coils in mutually superposed relation against the wall of the mold, and permitting the arranged coils to cool before removal from the mold.

2. The process of making candy baskets which comprises preparing a candy batch, maintaining the same at a temperature to render it plastic, drawing the batch to strand form, and coiling the strand, while plastic, initially in the bottom of a concave mold and then upwardly in the mold and disposing the upwardly directed coils in mutually superposed relation against the wall of the mold.

3. The process of making candy baskets which comprises coiling a candy strand, while heated to a degree to render it plastic, initially in the bottom of a concave mold, and disposing the coils in mutually superposed relation against the wall of the mold, supporting another strand in arcuate form with its ends in juxtaposition to the uppermost coil produced by the preceding step, and uniting the said ends of the last mentioned strand, while plastic, to the said uppermost coil, whereby to provide a handle for the basket body produced by the coiling step.

In testimony whereof we affix our signatures.

ARIS VARKAS.
NICK VARKAS.
JAMES B. VARKAS.
JAMES PAXON.